F. P. McCOIG.
BROOM.
APPLICATION FILED AUG. 27, 1912.
1,057,866.
Patented Apr. 1, 1913.
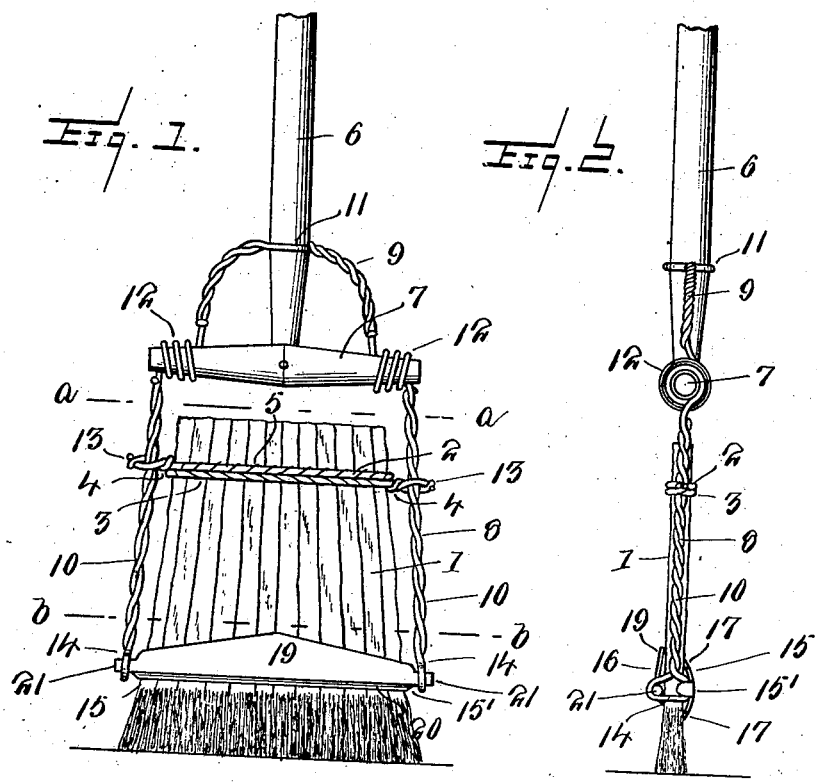
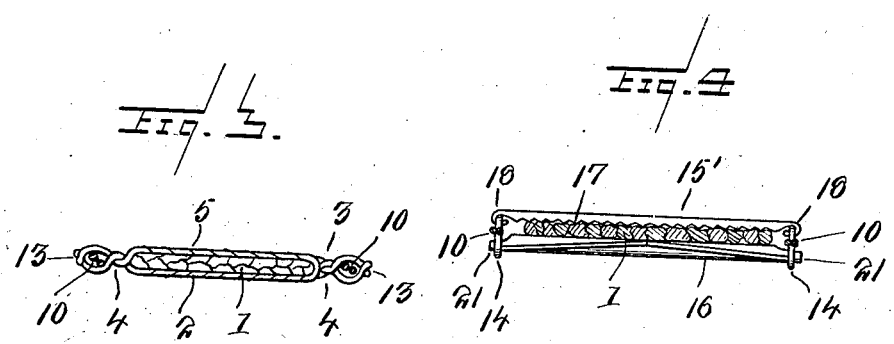
Witnesses
E. P. Ruppert
J. W. Garner
Inventor
Franklin P. McCoig
By Victor J. Evans
Attorney

UNITED STATES PATENT OFFICE.

FRANKLIN P. McCOIG, OF SAN PEDRO, CALIFORNIA, ASSIGNOR OF ONE-HALF TO NATHAN J. MARTIN, OF REDONDO BEACH, CALIFORNIA.

BROOM.

1,057,866.  Specification of Letters Patent.  Patented Apr. 1, 1913.

Application filed August 27, 1912. Serial No. 717,322.

*To all whom it may concern:*

Be it known that I, FRANKLIN P. McCoig, a citizen of the United States, residing at San Pedro, in the county of Los Angeles and State of California, have invented new and useful Improvements in Brooms, of which the following is a specification.

My invention relates to improvements in brooms, brushes, and the like, and consists in the construction, combination and arrangement of devices hereinafter described and claimed.

One object of my invention is to provide a broom or the like implement which is made of "bear" or "bunch" grass such as occurs in the arid regions of the southwest part of the United States.

Another object of my invention is to provide an improved handle or holder for a broom, brush or the like made of such grass.

In the accompanying drawing:—Figure 1 is an elevation of a broom constructed in accordance with my invention. Fig. 2 is a similar view of the same at right angles to Fig. 1. Fig. 3 is a sectional view on the plane indicated by the line *a—a* of Fig. 1, and Fig. 4 is a similar view on the plane indicated by the line *b—b* of Fig. 1.

I have discovered that a grass which occurs in the arid regions of the southwest and which is called in some localities "bear" grass and in others "bunch" grass is adapted for use in making heads for brooms, brushes, and other like implements.

In accordance with my invention, I provide a broom or brush head 1 which is preferably made of "bear" or "bunch" grass. The stalks of the grass are held together near the upper end of the head by a pair of wire bands 2—3. These bands are placed around the broom or brush head, the open ends of the bands are arranged at opposite sides of the head and are twisted together as at 4. The stalks of the grass are also held to these bands by stitching as at 5. While the fibers of such grass are well adapted for use in the making of a broom or brush head, the stalks of the grass are stiff and inelastic and, hence, in order to secure the required "spring" for my improved brush or broom, I provide a holder of novel construction which I will now describe.

The handle 6 is provided at one end with a cross arm 7. I also provide a substantially U-shaped bridle 8 which comprises a bight 9 and a pair of arms 10. The bight is formed with an eye or opening 11 through which the handle 6 extends and the arms are formed with spring coils 12 which are arranged around the ends of the cross arm 7. This bridle is preferably made of suitable spring wire and, hence, the coils thereof not only serve to connect the sides of the bridle to the cross arm of the handle but also enable the said sides to spring.

The head 1 of the brush or broom is arranged between the arms 10. The ends of the bands 2—3 are twisted together as at 13 so that eyes are formed at the ends of said bands through which eyes the arms 10 of the bridle extend and thereby the bands effect a slidable connection between the brush or broom head and the arms of the bridle and permit the said head to be adjusted toward and from the cross arm 7 so that compensation may be made for the wear of the outer ends of the fibers of the head incident to the use of the device. The bridle arms 10 are provided with eyes 14 at their outer ends. A clamp 15 is provided for the outer portion of the brush or broom head, this clamp being here shown as comprising members 15'—16 which are arranged on opposite sides of the head. The member 15' is provided at its side edges with teeth or serrations 17 which project into the fibers of the head and the said member 15' is formed at its ends with hooks 18 which engage the eyes 14 of the bridle arms. The member 16 is formed with a relatively broad web 19 and a relatively narrow web 20 at right angles to the web 19. Said web 19 is broadened at its center and narrowed toward its ends, and at the ends of the said member 16 are bearings 21 which engage the eyes 14 at points opposite the hooks 18. The said members 15'—16 are arranged on opposite sides of the head and when the member 16 is turned so as to cause the upper edge of its web 19 to bear against one side of the head, the web 20 is arranged a slight distance past the dead center of the pivotal connection between the said member and the eyes 14 so that the edge of the said web 20 is caused to bear against the head and thereby the head is firmly clamped between the members 15'—16. By releasing said members from the head, which may be done by partly turning the members 16, the head may be adjusted longitudinally in the bridle to compensate for wear at its outer end and may then be reclamped to the bridle as will be understood. Owing to the provision of the spring coils 12, the bridle or holder provides the required spring for the brush or broom and the same is rendered highly efficient.

I claim:—

In combination with a brush or broom head, a handle, a bridle connected to the handle and having spring arms arranged at opposite sides of the head, connecting means between the head and the said spring arms adapting the said head to be adjusted longitudinally between said spring arms, and a clamp carried by said spring arms and engaging the said head, the said clamp comprising a pair of members arranged on opposite sides of the head, one of said members being pivotally mounted and comprising a relatively broad web and a relatively narrow web at substantially right angles to the first-named web and presenting its edge to one side of the head.

In testimony whereof I affix my signature in presence of two witnesses.

FRANKLIN P. McCOIG.

Witnesses:
 WILL ZILCH,
 S. G. COMER.